June 14, 1938.    L. B. BUTTERFIELD    2,120,391
MEASURING DEVICE
Filed Nov. 10, 1934

INVENTOR
L. B. BUTTERFIELD
BY E. R. Nowlan
ATTORNEY

Patented June 14, 1938

2,120,391

UNITED STATES PATENT OFFICE 2,120,391

MEASURING DEVICE

Louis B. Butterfield, Short Hills, N. J., assignor to Western Electric Company, Incorporated, New York, N. Y., a corporation of New York Application November 10, 1934, Serial No. 752,429

6 Claims. (Cl. 175—183)

This invention relates to measuring devices and more particularly to devices for making electrical measurements requiring an unusually great range of scale.

The apparatus used in some instances to locate a fault of insulation or a break in a conductor in electrical cables comprises fundamentally a Wheatstone bridge circuit having a perfectly insulated conductor of the cable and the imperfectly insulated or broken conductor as arms of the bridge. As the lengths of cable under investigation may be of the order of hundreds or even thousands of feet, and the defect to be located may be anywhere in the entire length, and as it is important to locate the site of the defect with an accuracy of the order of one tenth of one percent, the possible scale reading required may extend over thousands of units and may need to be readable to the nearest unit or even in some instances, fraction of a unit.

One object of the present invention is to provide an apparatus for locating defects in conductors in which the variable element is compact and yet may be varied over a great range of values with a scale sufficiently wide to permit of distinguishing small variations clearly and rapidly.

One embodiment of the invention may be in an apparatus for locating faults in electrical conductors including a Wheatstone bridge or the like in which the element variable at will comprises a continuously variable element variably connected across a decade element of the same kind but of higher order by tandem switches, which decade element may in turn be variably connected in the same way across decade elements of still higher order.

Other objects and features of the invention will appear from the following detailed description of an embodiment thereof in apparatus for locating faults in a multi-conductor cable, taken in connection with the accompanying drawing in which the same reference numerals are applied to identical parts in the several figures and in which—

Figure 1:
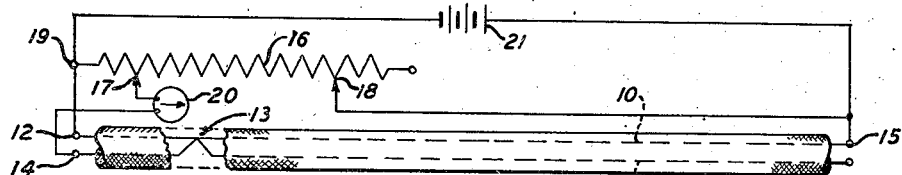
Fig. 1 is a diagram of the circuit connections of an apparatus for locating a conductive contact fault between two conductors of a cable.

In the form of embodiment of the invention herein disclosed Fig. 1 represents the circuit diagram of a well known cable fault locating device of the prior art such as disclosed in U. S. Patent 754,402 of March 8, 1904 to Daniel E. Wiseman. In this figure it is assumed that there is a contact due to faulty insulation at the point 13 between conductor 10 and conductor 11 of a cable and it is desired to locate the fault by determining its distance from the left hand end of the cable at 12, 14.

A variable resistance has a resistance wire or element 16 and two contacts 17 and 18 slidable thereon, the element 16 being of uniform resistance per unit of length. The conductor 10 is connected at its end 12 to the fixed terminal contact 19 of the resistance and at its end 15 to the slider 18. The conductor 11 is connected through an indicating device 20 such as a galvanometer to the slider 17. A battery or other source of current 21 is connected across 15 and 19.

The length of the cable being known, the slider 18 is set at a point on a scale associated with the resistance 16 and having its zero at the terminal 19, so that the number of resistance units between 18 and 19 is the same as the number of length units between 12 and 15. The slider 17 is then moved until the indicator 20 shows no current. The number of resistance units between 17 and 19, i. e. the scale reading of the slider 17, is then the same as the number of length units between 13 and 14.

Such an instrument is convenient and accurate provided that the scale associated with the resistance 16 is convenient and accurate, i. e. is both compact and has its graduations widely spaced. By the present invention it is possible to use a scale representing an aliquot portion only of the total resistance between points 17 and 19, this resistance as a whole being variable discontinuously in steps and also continuously variable over the range of any one step, the scale representing only the values of any one step.

Figure 2:
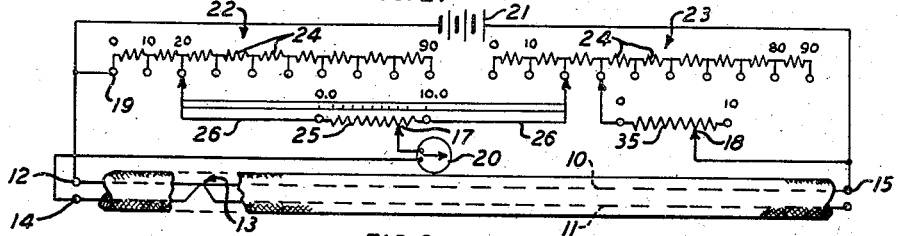
Fig. 2 is a diagram of the circuit of a similar device constructed in accordance with the invention.

Fig. 2 represents a method of accomplishing this result in accordance with the invention. The continuous resistance 16 of Fig. 1 is here replaced by a pair of identically similar resistance sequences 22 and 23. Sequence 22 consists of 9 identically similar resistances 24, 24 connected in series to the terminal 19 and having connection terminals between each two and at each end of the sequence. These may be numbered by tens from 0 to 90 inclusive. Sequence 23 is the same in construction. A third resistance 25 is provided equal in value to any one of the resistances 24 but provided with a continuously variable sliding contact 17 and a scale divided from 0.0 to 10.0 by tenths. Means are provided such as a pair of conductors 26, 26 provided with appropriate terminals whereby the resistance 25 may be bridged across any two like numbered plugs such as 2 and 2 of the sequences 22 and 23. To assist in connecting only like numbered plugs such as 2 and 2 of the sequences 22 and 23 it will be preferable to mount the unit 25 and the conductors 26, 26 on a rigid member such as the scale shown in Fig. 2 to maintain the terminals of the conductors 26, 26 rigidly interspaced at the distance between any unit of either sequence and the corresponding unit of the other sequence. Thus by shifting the connections 26, 26 along the sequences the resistance between 18 and 19 is unchanged while that between 17 and 19 is altered by steps of ten units. Then by sliding the contact 17 along the resistance 25, the continuous variation of the resistance between 17 and 19 is attained and is readable to tenths of a unit. To permit of setting contact 18 with a continuously variable accuracy equal to that of the setting of contact 17 and auxiliary resistance 35 is interposed between the sequence 23 and the contact 18. This resistance 35 may well be identically like resistance 25.

Figure 3:
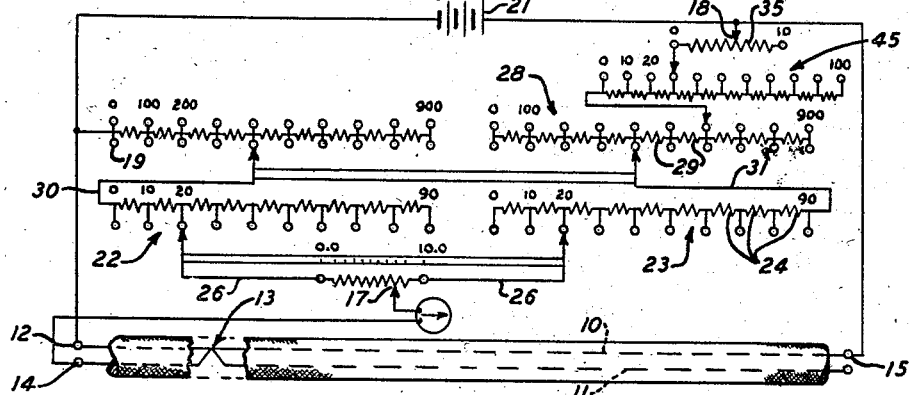
Fig. 3 is a diagram of the device of Fig. 2 expanded to a higher order.

Fig. 3 shows means for adding one further significant figure to the range of the device, i. e. for multiplying the range by ten. Here two additional identically similar sequences 27 and 28 of identically similar resistances 29, 29 are provided in which each resistance 29 has ten times the value of any resistance 24. Connectors 30 and 31 are provided whereby the zero terminal of sequence 22 may be connected to any terminal of sequence 27 and the 90 terminal of sequence 23 to any corresponding terminal of sequence 28. In this diagram the zero terminal of sequence 27 is also terminal 19. Although by this arrangement a total range of 1000.0 units is available with continuous variation over any and every part of the range, yet the scale required extends only over ten units and may easily be readable to one-tenth unit thus giving an accuracy of reading of 1 in 10,000 with a scale reading only from 0 to 100. Evidently another bank of resistances each ten times as great as the resistances 29 can be set under the sequences 27 and 28 as these are set under the sequences 22 and 23. Then the range is extended to 10,000.0 units readable to one-tenth unit and the accuracy becomes 1 part in 100,000. In this case a second auxiliary resistance sequence 45 having a range of 100 units by steps of 10 units is interposed between the sequence 28 and the first auxiliary resistance 35 to enable setting of contact 18 with the requisite accuracy.

Figure 4:
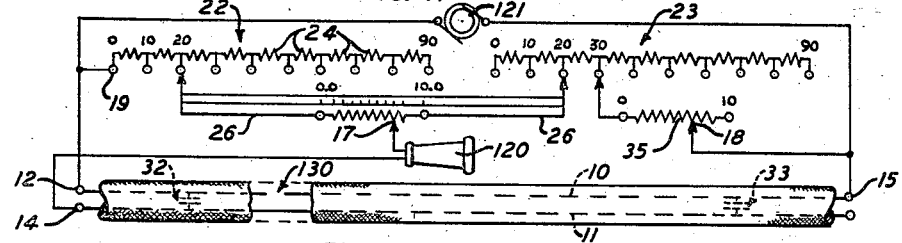
Fig. 4 is a diagram analogous to Fig. 2 but showing the apparatus as used to locate a break in a conductor.

Fig. 4 shows a modification of the apparatus of Fig. 2 as adapted to locate a break 130 in one conductor 10 of a cable. The galvanometer 20 of Fig. 1 is replaced by a telephone receiver 120 and the battery 21 by a source 121 of alternating current. Conductor 11 is any convenient unbroken conductor of the cable. The variable resistance device 16, 17, 18, 19 remains the same as does the mode of operation. The resistance 16 may, however, now be replaced by an inductance, the point in either case being to balance the resistances or inductances between 17 and 19, and 18 and 19 against the capacities indicated at 32 and 33. Here again the expanded resistance devices of Figs. 2 and 3 may replace the device 16 or an analogous apparatus having inductances in place of the resistances 24 and 29 may be used.

In case the fault is found to lie so near the left end of the conductor that the contact 17 should lie between connection 19 and the first step connection of sequence 22 in Figs. 2 or 4 or of sequence 27 in Fig. 3 the connections to the conductors are transferred to their respective other ends.

Figure 5:
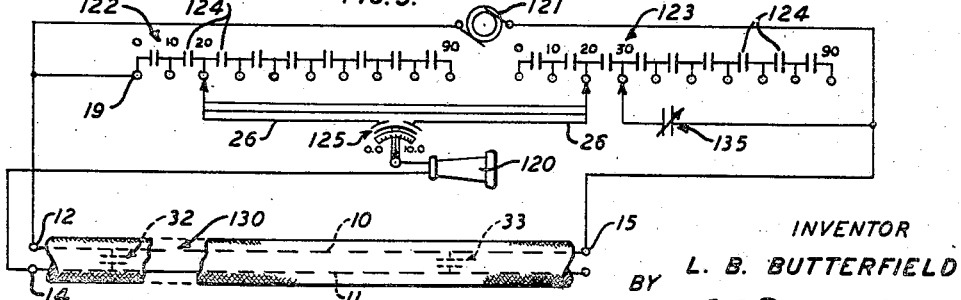
Fig. 5 is a diagram analogous to Fig. 2 in which capacitance units are used in place of resistances.

Fig. 5 shows the invention embodied in an apparatus analogous to that of Fig. 2 in which the resistances 24, 25 and 35 are replaced by capacitance units 124, 125 and 135, respectively. The unit 125 is a three plate condenser in which the outer plates connected to the wires 26, 26 are fixed and the central plate is variable.

A characteristic feature of the invention is the provision of the two mutually independent decade sequences 22 and 23 of electrical standard units 24 or 124 (resistances, inductances, capacitances, or the like) together with the adjustable auxiliary connection 26, 25, 26 or 26, 125, 26 between the sequences in which the element 25 or 125 has a fixed value between the decade sequences and a continuously variable value to a third connection, and in which the auxiliary connection may be connected from any unit of the one sequence, say 22, to a corresponding unit of the other sequence. It is to be noted that the two decade sequences 22 and 23 are mutually independent, i. e. are not electrically permanently or normally connected, being internally connectible in varying ways by means of the movable unit 25 and externally connectible in use through some normally unrelated conductor, e. g. conductor 10 in Fig. 2.

The embodiment of the invention herein disclosed is in an apparatus for locating faults in multi-conductor cable, but the invention is susceptible of many other applications where an electrical instrument employs a resistance, inductance or other divisible element together with a scale therefor and it is of advantage to have the scale reading cover an unusually great range at the same time that the reading is continuously minutely variable. Hence the embodiment herein disclosed is merely illustrative and may be widely varied and departed from without departing from the spirit and scope of the invention as pointed out in and limited solely by the appended claims.

What is claimed is:

1. An electrical measuring device comprising a first pair of decade sequences of standard electrical units all of identical electrical value, a second pair of decade sequences of standard electrical units each of one tenth the value of any unit of the first pair of sequences and one end terminal of one sequence of the second pair being connectible to any unit of one sequence of the first pair and the opposite end terminal of the second sequence of the second pair being connectible to the corresponding unit of the second sequence of the first pair, a connector unit identical in kind and total value with any unit of the second pair and connectible with fixed value by two terminals from any unit of one sequence of the second pair to a corresponding unit of the other sequence of the second pair, and means to connect the connector unit with continuously variable value to a third terminal.

2. In an electrical measuring device, a Wheatstone bridge circuit having two arms each comprising a decade sequence of standard electrical inductances all of identical electrical value, a connector inductance of like kind and identical value with any of the first named inductances and connectible with fixed value from any inductance of one arm sequence of inductances to a corresponding inductance of the other sequence of arm inductances, and means to connect the connector inductance with continuously variable value to the bridge of the circuit.

3. In an electrical measuring device, a Wheatstone bridge circuit having two arms each comprising a decade sequence of standard electrical capacitances all of identical electrical value, a connector capacitance of like kind and identical value with any of the first named capacitances and connectible with fixed value from any capacitance of one arm sequence of capacitances to a corresponding capacitance of the other sequence of arm capacitances, and means to connect the connector capacitance with continuously variable value to the bridge of the circuit.

4. In an electrical apparatus for locating faults in cable conductors, a decade sequence of standard electrical units connectible at one end thereof to one end of a perfect conductor of a cable, an identically similar sequence connectible to the other end of the perfect conductor at any unit of the sequence, means to impose an electromotive force along the conductor, a connector unit connectible at constant value from any unit of the first sequence to a corresponding unit of the second sequence and connectible at a continuously variable value from the said unit of the first sequence to one end of a faulty conductor of the cable, and an electrical detecting means in the series with the said unit of the first sequence and with the faulty conductor.

5. An electrical measuring device comprising a pair of mutually independent sequences of standard electrical units, a variable unit of like kind and identical electrical value connectible from any unit of one sequence to only the corresponding next unit of the other sequence, and means to connect the connector unit with continuously variable value to a third terminal.

6. An electrical measuring device comprising a pair of mutually independent sequences of standard electrical units, a variable unit of like kind and identical electrical value connectible by two terminals of fixed interspacing from any unit of one sequence to only the corresponding next unit of the other sequence, and means to connect the connector unit with continuously variable value to a third terminal.

LOUIS B. BUTTERFIELD.